United States Patent [19]

Le Ludec et al.

[11] Patent Number: 4,701,492

[45] Date of Patent: Oct. 20, 1987

[54] SULFURIZED TEPA/AMIDO COMPOUNDS AS INTERFACE AGENTS FOR VULCANIZABLE ELASTOMERIC MATRICES

[75] Inventors: Joel Le Ludec, Lyons; Jean Machurat, Neuville Sur Saone; Jean-Claude Morawski, Chassieu; Gerard Soula, Meyzieu, all of France

[73] Assignee: Rhone-Poulenc Chimie de Base, Courbevoie, France

[21] Appl. No.: 787,067

[22] Filed: Oct. 15, 1985

[30] Foreign Application Priority Data

Oct. 12, 1984 [FR] France ................ 8415654

[51] Int. Cl.$^4$ ............... C08K 3/34; C08L 7/00; C08L 9/00; C08L 9/06
[52] U.S. Cl. ................... 524/493; 523/208; 523/216; 524/210; 524/284; 524/196; 524/315; 524/354; 524/356; 524/571; 524/573; 524/574; 524/575; 524/579
[58] Field of Search ........... 524/571, 573, 574, 575, 524/579, 284, 315, 354, 356, 210, 196, 493; 523/208, 216

[56] References Cited

U.S. PATENT DOCUMENTS

| | | | |
|---|---|---|---|
| 2,692,871 | 10/1954 | Pechukas | 523/216 |
| 3,464,969 | 9/1969 | Stockmann et al. | |
| 3,499,865 | 3/1970 | Bosch | 524/571 |
| 3,768,537 | 10/1973 | Hess et al. | 524/571 |
| 3,796,683 | 3/1974 | Schwarze et al. | 524/571 |
| 3,994,742 | 11/1976 | Russell et al. | 106/288 B |
| 4,096,085 | 6/1978 | Holoman, Jr. et al. | |
| 4,332,967 | 6/1982 | Thompson et al. | |
| 4,377,418 | 3/1983 | Birchall et al. | 524/571 |
| 4,463,125 | 7/1984 | Stuchal | 524/571 |
| 4,519,430 | 5/1985 | Ahmad et al. | 524/571 |

*Primary Examiner*—Allan M. Lieberman
*Attorney, Agent, or Firm*—Burns, Doane, Swecker & Mathis

[57] ABSTRACT

Elastomer/filler interface agents for filled vulcanizable matrices, e.g., natural or synthetic rubber, comprise the amido reaction products of tetraethylene pentamine ("TEPA") with amide-forming organosulfur compounds.

15 Claims, No Drawings

SULFURIZED TEPA/AMIDO COMPOUNDS AS INTERFACE AGENTS FOR VULCANIZABLE ELASTOMERIC MATRICES

BACKGROUND OF THE INVENTION

1. Field of the Invention

The present invention relates to novel compositions especially adapted for enhancing the properties of vulcanized substrates, to a process for the preparation thereof, and to the use of said novel compositions particularly for the strengthening/reinforcing of natural and synthetic rubbers.

2. Description of the Prior Art

Research has long been carried out in this art in quest of additives to improve the properties of elastomers reinforced with mineral fillers, and particularly the properties of silica/rubber compositions.

It has been observed that the use of compounds containing amino groups in silica/rubber compositions vulcanized with sulfur improves the preparation and properties of the vulcanized materials; see, for example U.S. Pat. Nos. 2,692,870, 2,692,871 and 3,399,166, and French Pat. No. 1,436,625.

In U.S. Pat. No. 3,499,865 a preliminary reaction between the sulfur and the organic amines takes place in the presence of a portion of the filler used in the rubber (preparation of a masterbatch).

In U.S. Pat. No. 3,994,742 compounds containing both amino groups and sulfur groups are used. These are defined as being coupling agents, for the same reason as the well known derivatives of the mercaptosilane family, one representative of which, γ-mercaptopropyl trimethoxysilane, is acknowledged to be one of the most effective in this field (French Pat. No. 2,094,859).

U.S. Pat. Nos. 4,151,157 and 4,156,677 describe compounds which combine the three amino, sulfur and trialkoxysilane groups in the same structure.

Thus, it will be seen that very considerable research has been carried out in this field, but that the solutions proposed are not entirely satisfactory, either for economic reasons because the additives are still too expensive relative to the filler proper, as in the case of the mercapto-silanes, or for practical reasons because the additives are not effective enough or are difficult to prepare.

The problem is indeed extremely complex. On the one hand the task of mixing for vulcanization has to be facilitated, a step commonly described as aid processing, and on the other hand the properties of the vulcanized material have to be improved. In the vulcanizing process one, therefore, has to take into account not only the compatibility and particularly the solubility of the compounds added to the elastomeric matrix but also its behavior vis-a-vis the filler. This behavior must be known both from the chemical point of view and from the point of view of the structure or morphology of the filler.

It is also necessary to provide a composition which has sufficient stability at temperatures below vulcanization temperature, and which are active under vulcanizing conditions and in the vulcanization medium.

This explains why some compositions bearing both sulfur and nitrogen functions are not effective, and why it was found preferable to introduce the nitrogen function and the sulfur function separately.

It also explains why, despite considerable work done on the subject for several decades and despite the large number of additives proposed, particularly in the silane family, better solutions to the problem are still being researched.

Applicants have thus been led to take a different approach, breaking away from the traditional one, and using what they deem "interface agents".

This term is used in the sense of an additive containing:
(1) at least part of a molecule which has more affinity to silica than to the other ingredients of the rubber mix;
(2) an alkyl group compatible with the elastomer.

The effect of such additive is to reduce the cohesion of the silica network.

Applicants first developed additive compositions based on alkenyl succinimides, obtained by condensing a polyamine on a succinic alkenyl anhydride in which the alkenyl radical contained from 3 to 100 and preferably 3 to 80 carbon atoms (European Pat. No. 32,076).

It was noted that these products also displayed a marked synergistic effect with conventional silanes (European Pat. No. 34,970).

Of the interface agents, tetraethylene pentamine (TEPA) derivatives have been found to be particularly effective. These derivatives are also quite inexpensive, firstly because of their ease of preparation and secondly because of the accessibility of the raw materials; the commercial TEPA used is in fact a mixture of polyamines containing varying proportions of pure TEPA.

TEPA is known as a vulcanizing agent and sulfur activator. It has unfortunately been found to be highly reactive with sulfur groups, a fact which may lead to a loss of sulfur in the form of hydrogen sulfide, $H_2S$.

SUMMARY OF THE INVENTION

Accordingly, a major object of the present invention was the determination, after considerable effort, that the deficiencies, disadvantages and drawbacks associated with the known use of TEPA are overcome by reacting at least one compound containing at least one sulfur group with compositions based on tetraethylene pentamine.

Compositions based on tetraethylene pentamine will hereinafter be referred to simply as TEPA.

In practice, said compositions correspond to commercial products which, in addition to the tetraethylene pentamine proper, contain other derivatives which can themselves react in the preparation of the product according to the invention.

It has been observed that reaction conditions are quite important and that, generally speaking, temperature conditions must be moderate in order to avoid premature destruction of the sulfur groups and the initiation of competing or parasitic reactions.

These moderate conditions may be produced in several ways to obtain the compositions of the invention.

DETAILED DESCRIPTION OF THE INVENTION

More particularly according to the present invention, the carrier (or substrate) for the sulfur group may, for example, be an ester which enables the reaction with the TEPA to be carried out, advantageously, at temperatures not above 110° C. and more generally from 30° C. to 100° C. Apart from the fact that this mode of operation does not destroy the sulfur group, it has the advantage of limiting the subsequent conversion of formed derivatives having an amide bond to derivatives comprising an imidazoline ring, and hence of providing better selectivity for the products required, by the reaction:

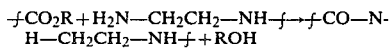

while avoiding the formation of

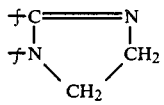

products.

R represents an alkyl radical; it is selected such that the alcohol formed, ROH, is easy to eliminate from the medium, if desired. R is preferably —CH$_3$ or —C$_2$H$_5$.

In another embodiment of the invention, an acid may be used as the sulfur group carrier, advantageously in the presence of an effective condensing agent. The condensing agent may, for example, by dicyclohexyl carbodiimide (DCCI), which enables the reaction between the TEPA and the acids bearing the sulfur function to be carried out, advantageously within the temperature range 0°–25° C., with excellent selectivity for derivatives with an amide bond, by the following reaction

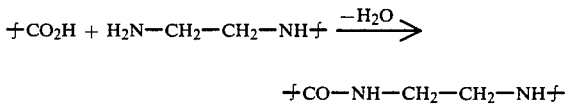

An alkyl or aryl isothiocyanate which reacts with TEPA, either at room temperature or by heating to about 40°–60° C., may equally be used as a carrier for the sulfur group.

Thus, generally speaking, the sulfur is added to the TEPA under gentle conditions and in one stage, by condensation or addition of the composition containing the TEPA to a carrier (or substrate) for at least one sulfur group.

Depending upon what product is desired, one skilled in this art has to adjust the nature of the carrier, more specifically the nature and number of functions able to react with the amino functions of the TEPA, the nature and number of sulfur groups and also the natural and length of the spacer linking the two types of functions of the carrier; none of these objectives has to date been possible by any other method.

The carrier (or substrate) may be an acid (mono or difunctional) or derivatives thereof such as anhydrides and ester (mono or difunctional), an isothiocyanate or an aldehyde, ketone or epoxide.

The carrier may in particular contain:
(i) at least one mercaptan group, —SH
(ii) at least one polysulfide group, —S$_x$—, with $x \geq 2$ At least one isothiocyanate group, —NCS—, is also envisaged without departing from the scope of the invention.

To obtain derivatives of TEPA with an SH group a process including the following steps may, for example, be used:

(1) reacting the mercaptoester of the formula HS(CH$_2$)$_n$CO$_2$CH$_3$, preferably with n=1 to 10, with the TEPA, advantageously at about 30°–90° C., with or without a diluent, the diluent preferably being an aromatic hydrocarbon such as xylene or toluene.

Since the TEPA base position is virtually assimilated to the pure TEPA of mass 189, the molar ratio mercaptoester/TEPA is at least 1, at the maximum 5 depending on the purity of the commercial product, and preferably from 1 to 3.

(2) Eliminating the alcohol formed by conventional methods, while taking care to maintain the above temperatures, although the alcohol may equally be left in the medium in order to simplify the process.

The mercaptoester may, for example, be obtained as follows:

(a) preparing a mercaptoacid in known manner (adding thioacetic acid to a mono-unsaturated acid, then saponifying it in accordance with *J. Org. Chem.*, 23, 1525 (1958));

(b) esterifying the mercaptoacid with an alcohol such as methanol. In this manner, one produces an aliphatic ester of the formula:

$$HS(CH_2)_nCO_2CH_3 \quad n = 3 \text{ to } 10$$

More specifically, the starting material may equally as well be a diester, such as methyl 2-mercaptosuccinate.

If the previously prepared mercapto acid is to be condensed directly with the TEPA, a condensing agent such as dicyclohexyl carbodiimide (DCCI) is then used and the reaction is preferably carried out at 0°–25° C., in a medium such as methylene chloride, which dissolves the composition of sulfur products formed, but not the conversion product of the condensing agent, such as dicyclohexyl urea. With the DCCI converted to dicyclohexyl urea, which is insoluble in the reaction medium, filtering is all that is necessary to recover the composition of sulfur products previously formed.

In another embodiment of the invention, the following operations are carried out:

(1) reacting sulfur with a mono-unsaturated ester to obtain a sulfurized ester, the S/ester ratio being a minimum 2 and a maximum 6 depending upon the quantity of sulfur used (2 to 6 g/atoms of sulfur per mole of ester) and the reaction conditions (temperature 140° C.–160° C., duration 3 hours to 16 hours);

(2) reacting the sulfurized ester with the TEPA by heating it to 30°–90° C. with or without a solvent in the form of xylene or toluene.

The molar ratio of sulfurized ester/TEPA being at least 1 and at the maximum 5 according to the purity of the TEPA;

(3) removing the alcohol formed in the usual manner or permitting it to remain in the reaction medium.

The stage 1 reaction may be carried out in a benzene hydrocarbo medium if necessary, such as xylene or toluene, and possibly under autogenous pressure in a closed tube if the ester has a boiling point below 140° C.

Some examples of esters which can be sulfurized are monoesters such as methyl oleate, methyl undecylenate or diesters such methyl tetrapropenyl succinate, methyl tetrahydrophthalate, methyl maleate and methyl itaconate.

These provide derivatives with polysulfide functions which are found to be particularly effective.

These special embodiments which can be combined do not of course limit the scope of the invention; indeed they reflect that the very idea of the invention is universally applicable.

The products which can be obtained by the method of the invention obviously circumscribe other objects thereof.

Such products may be used alone or in combination. They may be mixed together or used with other interface and/or coupling additives.

But as previously stated, the compositions must be effective in the medium in which they will undergo heat treatment.

The sulfur groups in particular must be stable enough to be prepared and maintained, but not too stable to be active within the range of vulcanizing temperatures, in the case of vulcanized products. Furthermore, their activity must not be chemically destroyed within this temperature range by other constituents of the medium in question.

The compositions of the invention are generally applicable to cases which require good dispersion and good coupling in a polymer matrix.

The invention applies more particularly to elastomeric compositions which, for every 100 parts by weight of natural or synthetic rubber, contain from 0.1 to 4 parts of stearic acid, 0.1 to 5 parts by weight of a cross-linking agent (essentially sulfur), 0.2 to 6 parts of accelerators, 0.0 to 6.0 parts of antioxidant, 0 to 50 parts of plasticizer, 0.1 to 10 parts of zinc oxide, 10 to 60 parts by weight of filler and 0.1 to 5 parts by weight of a composition according to the invention.

Such elastomeric compositions are advantageously vulcanized at a temperature from 100° to 200° C. for an SBR type or natural rubber.

In cases where mixtures for making tires have to be strengthened, the strengthening mineral fillers are, in particular, silicas obtained by precipitation and having a CTAB specific surface area advantageously ranging from 100 to 300 m$^2$/g.

So-called large surface silicas may in particular be used, that is to say, having a CTAB surface over 180 m$^2$/g.

These silicas either may or may not be used simultaneously with carbon black.

The filler could possibly act as a carrier for the product according to the invention.

In order to further illustrate the present invention and the advantages thereof, the following specific examples are given, it being understood that same are intended only as illustrative and in nowise limitative.

In said examples to follow, the following products were used:

Silane: gamma-mercaptopropyl-trimethoxysilane, marketed by Union Carbide as A-189.

Product 1:

66.6 g of TEPA (0.35 moles) and 100 ml of toluene were introduced into a one liter flask equipped with a central agitator, thermometer, bromine funnel and Vigreux column surmounted by a distillation head and downstream by a condensor and receiver (the apparatus was placed under a nitrogen atmosphere).

55 g of methyl β-mercaptopropionate (0.46 mole) were then poured into the vessel over 10 minutes.

The mixture was brought to a temperature of 50° C. and this temperature was maintained for about 5 hours until no more methanol was formed (such was determined by gas phase chromatography).

The apparatus was then subjected to a pressure of 33 to 39 10$^2$ Pa to remove the toluene and methanol.

The product obtained was a brown liquid, which was viscous when cold and which contained 11.3% of sulfur.

Infra-red analysis revealed the presence of bands characteristic of the amide bond.

Product 2:

62.4 g of TEPA (same compound as above) (0.33 mole) and 60 ml of toluene were placed into the same apparatus as was used for preparing Product 1.

79.2 g of methyl β-mercaptopropionate (0.66 mole) were then stirred into this medium over 10 minutes.

The mixture was brought to a temperature of 50° C. and this temperature was maintained until no more methanol was formed (6 hours).

The treatment was identical to that used for preparing Product 1.

A brown, viscous material was obtained, containing 13.6% of sulfur.

Infra-red analysis confirmed the presence of bands characteristic of the amide bond.

Product 3:

77.2 g of methyl undecylenate (0.39 mole), 50 ml of xylene and 25 g of sulfur (0.78 g/atom) were placed into the same apparatus as above and heated to 160° C. for 3 hours, 30 minutes, until the sulfur had fully reacted.

The mix was cooled to about 80° C., then 56.7 g of TEPA (0.3 mole) were poured therein over 15 minutes. Heating and agitation were maintained until no more methanol was formed (about 6 hours).

The apparatus was then placed under a slight vacuum (33 10$^2$ Pa) to eliminate the xylene and methanol.

The composition of products obtained was a viscous liquid containing 13.5% of sulfur.

Infra-red analysis confirmed the presence of amide bonds.

Product 4:

150 g of TEPA (0.79 mole) were placed into the same apparatus as above, and 221 g of methyl 11-mercaptoundecanoate were added thereto over 5 minutes.

The apparatus was subjected to a pressure of 6.6 10$^2$ Pa and the receiver was immersed in liquid air.

The mix was brought gradually to a temperature of 80° C. with continuous stirring and was maintained under these conditions until the formation of methanol had terminated (volume collected in receiver: 38 ml or 98% theory).

The brown reaction mixture which remained in the flask solidified at normal temperature. The sulfur content was 8.1% and its infra-red spectrum evidenced bands of the amide type.

Product 5:

A 1 liter flask was used, equipped with a central agitator, thermometer, bromine funnel and cooler. 68.9 g of β-mercaptopropionic acid (0.65 mole) and 80 ml of methylene chloride were placed in the flask. The solution obtained was cooled to 0° C. in a bath of solid carbon dioxide, and 133.9 g of dicyclohexyl carbodiimide (0.65 mole) dissolved in 100 ml of methylene chloride were poured therein over 30 minutes, with the temperature being maintained at 0° C., after which 61.4 g of TEPA (0.32 mole) in 90 ml of methylene chloride were poured therein over 1 hour. Agitation was contained for 3 hours and the medium, which had become heterogeneous, was filtered.

The following substances were obtained:

(i) a white solid (N,N'-dicyclohexylurea) which was washed with cold methylene chloride and dried (weight 139.6 g or 96% theory, melting point 232° C.);

(ii) a yellow filtrate, to which the solvent from the previous wash was added. When all of the methylene chloride had been removed in a rotating evaporator, 126 g of light brown substance were obtained, which substance was viscous when cold and which contained 16% of sulfur. Infra-red analysis confirmed the presence of amide bonds.

The silica used in the following examples had the following characteristics:

| Silica: loss of weight on combustion | | 12.5% |
|---|---|---|
| pH (5/g 100 cc) | | 6–7.5 |
| BET surface (m$^2$/g) | $\neq$ | 175 |
| CTAB surface (m$^2$/g) | $\neq$ | 175 |

The CTAB surface (external surface), by adsorption of trimethyl ammonium cetyl bromide at pH 9, was determined by the method described by JAY, JANSEN and C. KRAUS, in *Rubber Chemistry and Technology*, 44, pages 1287–1296 (1974).

The products were used as follows.

FIRST PHASE:

The mix was prepared by the normal procedure for this type of preparation. All of the ingredients (except for the sulfur and accelerators) were mixed with an internal mixer of the BANBURY BR type at a temperature of about 110°/120° C.

SECOND PHASE:

The sulfur and accelerators were added in the form of a masterbatch using a cylinder type mixer (temperature 50°/100° C.).

The following tests were carried out:

MECHANICAL, STATIC AND DYNAMIC TESTS:

(1) MONSANTO rheometer (ASTM D 2084)

Measured the rheological properties of the mix during vulcanization.

(a) minimum torque (mT): consistency of non-vulcanized mix ("raw" mix) at testing temperature;

(b) maximum torgue (MT): consistency of mix after cross-linking;

(c) Δ torque: MT-mT is related to cross-linking rate;

(d) precocity: time required to begin cross-linking at testing temperature;

(e) index: related to vulcanizing speed (optimum time-precocity);

(f) optimum time:

$$X = \frac{(MT - mT) \times 90}{100} + mT$$

Torque $X \longrightarrow Y$ minutes = optimum time
(ordinate)      (abscissa)

These methods are described particularly in the *Encyclopedia of Polymer Science and Technology*, 12, page 265 (Interscience Publishers-John WILEY & Sons, Inc.).

(2) Static properties:

These are the properties measured in standards:

(a)—ASTM D 412-51 T
  Ultimate stress MPa
  Elongation %
  Modulus MPa (b)—ASTM D 2240-75
  Shore A hardness (c)—French Standard T 47-126
  Trouser tearing kN/m (d)—DIN 53516
  Abrasion (resistance to)

(e)—ASTM D 1054-55
  Bounce (3) Dynamic properties:
ASTM D 623-67.
  Goodrich flexometer This apparatus subjects the vulcanized substance to dynamic deformations produced by static compression with dynamic compression superposed.

(a) static compression (SC%): deflection under constant load;

(b) permanent deformation (PD%): % of residual deformation after test;

(c) dynamic comression (DC%): % of deformation at equilibrium during test
  DCB: dynamic compression at beginning of test
  DCE: dynamic compression at end of test
  Δ DC=DCE−DCB evolution of dynamic compression, related to resistance to fatigue;

(d) Δ T. base: Δ T. between temperature at surface of sample (at its base) and temperature of chamber;

(e) Δ T. core: Δ T. between temperature at core of sample and temperature of chamber;

(f) conditions for tests:
  load 106.7N (24 lbs), deflection 22.2%, frequency 21.4 Hz, temperature of chamber=50° C.

EXAMPLE 1

A first series of tests was carried out using a composition based on synthetic rubber (SBR) and having the following formulation (in parts by weight):

| (i) Styrene butadiene copolymer (SBR 1509) | 100 |
|---|---|
| (ii) Silica | 50 |
| (iii) Polyethylene glycol (PEG 4000) | 3.0 |
| (iv) Stearic acid | 3.0 |
| (v) Active ZnO | 3.00 |
| (vi) MBTS accelerator | 0.75 |
| (vii) DOTG accelerator | 1.50 |
| (viii) Antioxidant: octyldiphenylamine (Permanax OD) | 2.00 |
| (ix) Sulfur | 2.25 |
| (x) Additive, as in Tables | |

TABLE I

| MIXTURE REFERENCE | 1 | 2 | 3 | 4 | 5 | 6 | 7 |
|---|---|---|---|---|---|---|---|
| PRODUCT REFERENCE | — | Silane A. 189 | 1 | 2 | 3 | 4 | 5 |
| % OF SILICA | — | 3% | 4.25% | 5.6% | 6.4% | 5.95% | 5.6% |

TABLE II

| | MT | mT | ΔT | TIME 90 | TIME + 2 | INDEX |
|---|---|---|---|---|---|---|
| 1 | 79 | 12 | 67 | 11 min, 30 sec | 4 min, 30 sec | 7 min, 00 sec |
| 2 | 86.5 | 20 | 66.5 | 8 min, 30 sec | 1 min, 10 sec | 7 min, 20 sec |
| 3 | 85 | 18 | 67 | 8 min, 45 sec | 1 min, 30 sec | 7 min, 15 sec |
| 4 | 85 | 22 | 63 | 12 min, 00 sec | 1 min, 05 sec | 10 min, 55 sec |
| 5 | 91 | 20 | 71 | 9 min, 15 sec | 1 min, 30 sec | 7 min, 45 sec |
| 6 | 86 | 25 | 61 | 11 min, 15 sec | 1 min, 15 sec | 10 min, 00 sec |
| 7 | 86 | 17 | 69 | 9 min, | 1 min, 15 sec | 7 min, 45 sec |

TABLE II-continued

| MT | mT | ΔT | TIME 90 | TIME + 2 | INDEX |
|----|----|----|----|----|----|
|    |    |    | 00 sec |    |    |

TABLE III

| ShA | Mod. 50% MPa | Mod. 100% MPa | Mod. 300% MPa | Ultimate stress MPa | Elongation at rupture % | Trouser tearing KN/m | Abrasion DIN | Bounce |
|----|----|----|----|----|----|----|----|----|
| 66 | 1.18 | 1.50 | 3.44 | 16.0 | 645 | 17 | 156 | 32 |
| 67 | 1.55 | 2.43 | 8.33 | 20.8 | 538 | 43 | 101 | 37 |
| 65 | 1.27 | 1.82 | 4.66 | 16.8 | 637 | 17 | 139 | 39 |
| 67 | 1.37 | 2.05 | 5.62 | 17.2 | 580 | 29 | 121 | 38 |
| 70 | 1.58 | 2.29 | 6.23 | 17.4 | 492 | 27 | 125 | 39 |
| 67 | 1.45 | 2.11 | 5.69 | 17.7 | 615 | 33 | 123 | 42 |
| 67 | 1.43 | 2.03 | 5.16 | 16.9 | 596 | 20 | 140 | 37 |

TABLE IV

| SC % | DCB % | DCE % | ΔDC % | ΔT.base °C. | ΔT.core °C. | PD % |
|----|----|----|----|----|----|----|
| 14.3 | 6.0 | 12.2 | +6.2 | 35.5 | 112 | 6.0 |
| 11.6 | 2.1 | 3.9 | +1.8 | 26.5 | 85.5 | 2.2 |
| 15.2 | 5.3 | 8.9 | +3.6 | 30 | 101 | 3.9 |
| 13.8 | 4.5 | 9.3 | +4.8 | 33 | 116 | 4.5 |
| 12.4 | 2.7 | 6.3 | +3.6 | 28 | 98 | 3.4 |
| 12.0 | 2.5 | 8.3 | +5.8 | 31 | 110 | 4.2 |
| 13.0 | 3.6 | 9.0 | +5.4 | 34 | 122 | 5.2 |

TABLE V
SUMMARY OF PRINCIPAL CHARACTERISTICS

| FORMULA | HARDNESS Sh A | BOUNCE % | MOD 50% MPa | MOD 300% MPa | TEARING KN/m | ABR DIN mm³ | ΔT C °C. |
|----|----|----|----|----|----|----|----|
| — | 66 | 32 | 1.18 | 3.44 | 17 | 156 | 112 |
| $HS-(CH_2)_3Si(OCH_3)_3$ | 67 | 37 | 1.55 | 8.33 | 43 | 101 | 85.5 |
| $HS-(CH_2)_2-CO-\boxed{TEPA}$ (1) | 65 | 39 | 1.27 | 4.66 | 17 | 139 | 101 |
| $HS-(CH_2)_2-CO\diagdown$ <br> $\phantom{HS-(CH_2)_2-CO}\boxed{TEPA}$ (2) <br> $HS-(CH_2)_2-CO\diagup$ | 67 | 38 | 1.37 | 5.62 | 29 | 121 | 116 |
| $CH_2-CH-(CH_2)_8-CO-\boxed{TEPA}$ (3) <br> $\diagdown S_2 \diagup$ | 70 | 39 | 1.58 | 6.23 | 27 | 125 | 98 |
| $HS-(CH_2)_{10}-CO-\boxed{TEPA}$ (4) | 67 | 42 | 1.45 | 5.69 | 33 | 123 | 110 |
| $HS-(CH_2)_2-CO\diagdown$ <br> $\phantom{HS-(CH_2)_2-CO}\boxed{TEPA}$ (5) <br> $HS-(CH_2)_2-CO\diagup$ | 67 | 37 | 1.43 | 5.16 | 20 | 140 | 122 |

ANALYSIS OF RESULTS:

Mixtures 1 (SBR-silica) and 2 (SBR-silica-silane) were the two control mixtures which enabled the effectiveness of the various products tested to be judged.

This comparison reflects the improvements that can be obtained with silane, in all of the static and dynamic properties of silica reinforced vulcanized materials.

In sum, an elastomer-silica 175 m²-silane mixture can be said to have an overall level of performance equivalent to an elastomer-carbon black N.300 mixture.

PRODUCTS 1, 2 4 AND 5:
Resistance to abrasion (Table V):

If all mixes are considered, it will be seen that the correlation between modulus 300 and resistance to abrasion (well known for carbon blacks) is respected.

It will also be seen that:

(i) Product 4 (one SH and 10 $CH_2$ functions) was an improvement over Product 1 (one SH and 2 $CH_2$ functions);

(ii) Product 2 (two SH and 2 $CH_2$ functions) was an improvement over Product 1 (one SH and 2 $CH_2$ functions);

(iii) Product 2 (different mode of operation) was an improvement over Product 5.

Heating (ΔT.C):

It will further be noted that Product 1 provided a marked improvement both in heating (11° C.) and abrasion resistance (10%).

Tearing:

Two products evidenced substantial improvement (P 2 and P 4).

Same were true improvements, bearing in mind that they were accompanied by an increase in modulus and bounce.

Bounce (elasticity):

This was at the same level for all products (P 1-P 5-P 2) or at a level for greater than silane (P 4).

The increase in bounce (P 4) was more significant, considering the fact that it was not accompanied by a reduction in hardness.

PRODUCT 3:

All of the static and dynamic properties were improved.

The improvements are expressed as % and were improvements relative to the control samples, i.e., to the Δ of the control samples.

| | |
|---|---|
| Heating | Gain ... 50% |
| Resistance to abrasion | Gain ... 50% |
| Tearing | Gain ... 40% |
| Modulus 50% | Gain ... 100% |
| Modulus 300% | Gain ... 60% |
| Hardness | Better than silane control |
| Bounce | Better than silane control |

The product according to the invention can be seen to behave in a specific fashion. Compared with the control, it can be seen to have an improvement in properties which varied in extent and range, but was always significant. Compared with a silane (or a silane-succinimide composition), it may even behave better than silane in the case of hardness and bounce in Product 3. This was all the more remarkable, considering that this product effects a very effective improvement in the other properties.

EXAMPLE 2

A second series of tests was carried out using a formulation based on natural rubber and consisting, in parts by weight, of:

| | |
|---|---|
| (i) Natural rubber, SMR 5L | 100.00 |
| (ii) Stearic acid | 1.50 |
| (iii) Zinc oxide | 4.50 |
| (iv) N—Isopropyl-N—phenyl-N'—phenyl-p-phenylene diamine (antioxidant PERMANAX IPPD) | 1.50 |
| (v) N—1,3-Dimethylbutyl N'—phenyl-p-phenylene diamine (antioxidant PERMANAX 6PPI) | 1.50 |
| (vi) Accelerator VULCAFOR CBS N—cyclohexyl-2-benzothiozylsulfenamide | 4.00 |
| (vii) Sulfur | 1.50 |
| (viii) Silica | 50 |
| (ix) Additive (as in the Table) | |

TABLE VI

| MIXTURE REFERENCE | 8 | 9 | 10 | 11 | 12 |
|---|---|---|---|---|---|
| PRODUCT REFERENCE | — | SILANE A. 189 | 5 | 3 | 4 |
| % OF SILICA | — | 3.0 | 5.6 | 64 (*) | 5.95 |

(*) Mixture "grilled" and remade with 3.2%

BANBURY:

1st phase:

NR+filler+antioxidant+steariic acid+coupling agent+ZnO: end of mixing 150° C.

2nd phase:

Operation repeated after 24 hours with addition of accelerator

CBS: end of mixing 120° C.

OPEN BLENDER:

Mixing resumed after 24 hours

Sulfur added

Fine filtering** (4 times)

Drawn into a sheet (2 mm)

The results are summarized in the following tables.

**final operation

TABLE VII

| MT | mT | ΔT | TIME 90 | TIME +2 | INDEX | REV. |
|---|---|---|---|---|---|---|
| 92.5 | 26 | 66.5 | 6 min, 45 sec | 3 min, 30 sec | 3 min, 15 sec | −10 |
| 93.5 | 22 | 71.5 | 7 min, 45 sec | 4 min, 20 sec | 3 min, 25 sec | −4.5 |
| 94 | 22.5 | 71.5 | 5 min, 15 sec | 2 min, 30 sec | 2 min, 45 sec | −3 |
| 83.5 | 24 | 59.5 | 6 min, 00 sec | 3 min, 00 sec | 3 min, 00 sec | −15 |
| 88.5 | 16 | 72.5 | 5 min, 20 sec | 2 min, 30 sec | 2 min, 50 sec | −0 |

TABLE VIII

| ΔShA | Mod. 50% MPa | Mod. 100% MPa | Mod. 300% MPa | Ultimate stress MPa | Elongation at rupture % | Trouser tearing KN/m | Abrasion DIN | Bounce |
|---|---|---|---|---|---|---|---|---|
| 67 | 1.38 | 2.14 | 9.33 | 29.4 | 623 | 74 | 168 | 37 |
| 72 | 1.94 | 3.62 | 15.9 | 32.5 | 538 | 73 | 121 | 39 |
| 72 | 1.82 | 3.06 | 12.55 | 30.1 | 575 | 68 | 153 | 38 |
| 70 | 1.42 | 2.20 | 9.43 | 29.9 | 618 | 72 | 168 | 34 |
| 73 | 2.03 | 3.40 | 13.2 | 28.4 | 525 | 30 | 171 | 36 |

TABLE IX

| SC % | DCB % | DCE % | ΔDC % | ΔT.base °C. | ΔT.core °C. | PD % |
|---|---|---|---|---|---|---|
| 15.1 | 7.5 | 10.5 | +3.0 | 18 | 77 | 4.1 |
| 12.3 | 3.6 | 5.2 | +1.6 | 18 | 71.5 | 2.6 |
| 12.7 | 3.8 | 5.0 | +1.2 | 16 | 58.5 | 2.3 |
| 16.0 | 8.4 | 12.2 | +3.8 | 18.5 | 80 | 4.6 |
| 10.6 | 2.0 | 2.7 | +0.7 | 16 | 59 | 2.1 |

ANALYSIS OF RESULTS:

The two mixes (elastomer-silica and elastomer-silica-silane) were the two control mixes which enabled the effectiveness of the various products tested to be judged.

The remarks about silane in connection with SBR (Example 1) also apply to natural rubber.

Products 4 and 5 evidence a very marked increase in the 300% and particularly the 50% elongation moduli.

All of the dynamic properties were much improved.

Some improvements obtained were better: (Δ) DC, (ΔT. base), (PD) or much better (ΔT. core) than those recorded with silane.

TABLE X

SUMMARY OF PRINCIPAL CHARACTERISTICS

| FORMULA | HARDNESS Sh A | BOUNCE % | MOD 50% MPa | MOD 300% MPa | TROUSER TEARING KN/m | ABR DIN mm³ | ΔT C °C |
|---|---|---|---|---|---|---|---|
| — | 67 | 37 | 1.38 | 9.33 | 74 | 168 | 77 |
| $HS-(CH_2)_3Si(OCH_3)_3$ | 72 | 39 | 1.94 | 15.9 | 73 | 121 | 71.5 |
|  (3) | 70 | 34 | 1.42 | 9.43 | 72 | 168 | 80 |
| $HS-(CH_2)_{10}-CO-$ TEPA (4) | 73 | 36 | 2.03 | 13.2 | 30 | 171 | 59 |
|  (5) | 72 | 38 | 1.82 | 12.5 | 68 | 153 | 58.5 |

This Example evidenced that, in the case of natural rubber, there was, with some products, an improvement which may be greater than those observed with formulations using silane only. This is surprising and points in the same direction as the results observed with synthetic rubber.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising (i) a sulfur vulcanization elastomeric matrix, (ii) a reinforcing amount of a siliceous filler material therefor, (iii) an effective amount of a vulcanizing agent for said matrix, and (iv) an amount effective to reduce the cohesion of the siliceous filler network of an elastomer/filler interface agent which comprises the amido reaction product of tetraethylene pentamine with an amide-forming organosulfur compound.

2. The composition of matter as defined by claim 1, said vulcanizable elastomeric matrix (i) comprising a natural or synthetic rubber.

3. The composition of matter as defined by claim 2, said reinforcing filler (ii) comprising a silica.

4. The composition of matter as defined by claim 3, said reinforcing filler (ii) comprising precipitated silica.

5. The composition of matter as defined by claim 3, said reinforcing filler (ii) comprising a silica having CTAB surface of at least 180 m²/g.

6. The composition of matter as defined by claim 2, said reinforcing filler (ii) further comprising carbon black.

7. The composition of matter as defined by claim 1, said organosulfur compound comprising a mercaptoester.

8. The composition of matter as defined by claim 1, said organosulfur compound comprising a mercaptoacid.

9. The composition of matter as defined by claim 1, said organosulfur compound comprising a mercaptan.

10. The composition of matter as defined by claim 1, said organosulfur compound comprising a polysulfide.

11. The composition of matter as defined by claim 1, said organosulfur compound comprising an isothiocyanate.

12. The composition of matter as defined by claim 1, said organosulfur compound comprising a sulfur containing ester, acid, anhydride, aldehyde, ketone or epoxide.

13. A vulcanizate of the composition of matter as defined by claim 1.

14. A tire comprising the vulcanizate as defined by claim 13.

15. A vulcanizate of the composition of matter as defined by claim 2.

* * * * *